United States Patent
Arns, Jr. et al.

(10) Patent No.: US 7,755,350 B2
(45) Date of Patent: *Jul. 13, 2010

(54) SYSTEM AND METHOD OF PERPENDICULARLY MAGNETIZING POSITION INFORMATION IN A MAGNETICALLY HARD LAYER OF A MOVING COMPONENT

(75) Inventors: Donald C. Arns, Jr., Sonoma, CA (US); Pablo Garcia, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 12/252,342

(22) Filed: Oct. 15, 2008

(65) Prior Publication Data

US 2009/0033319 A1 Feb. 5, 2009

Related U.S. Application Data

(63) Continuation of application No. 11/782,005, filed on Jul. 24, 2007, now Pat. No. 7,439,733, which is a continuation of application No. 11/104,740, filed on Apr. 13, 2005, now Pat. No. 7,259,553.

(51) Int. Cl.
*G01B 7/14* (2006.01)
(52) U.S. Cl. .............. 324/207.26; 324/213; 324/207.24
(58) Field of Classification Search ...............
324/207.24–207.26, 210–213; 73/514.31, 73/514.39; 123/612, 617; 338/32 R, 32 H
See application file for complete search history.

(56) References Cited

U.S. PATENT DOCUMENTS 4,659,605 A 4/1987 Malik et al.

(Continued)

FOREIGN PATENT DOCUMENTS

JP 56142888 A 11/1981

(Continued)

OTHER PUBLICATIONS

Mitsubishi Heavy Ind Co Ltd, Piston Rod with Excellent Corrosion Resistance- Comprises Steel Treated on its Surface with Iron, Derwent, Acc-No. 1983-08972K, 1 Page.

(Continued)

*Primary Examiner*—Bot L LeDynh
(74) *Attorney, Agent, or Firm*—Guerin & Rodriquez, LLP; Michael A. Rodriquez

(57) ABSTRACT

A position-sensing system magnetically senses the position of a piston rod moving with respect to a cylinder. A magnetically hard layer on the piston rod provides a recording medium. Information is perpendicularly magnetized in regions of the magnetically hard layer. These regions provide an encoding scheme for determining the position of the piston rod. Magnetic-field sensors are positioned over redundant tracks of magnetically recorded regions. Each magnetic-field sensor positioned over a given track senses the same magnetized regions while the piston rod moves with respect to the cylinder. Other magnetic-field sensors can sense ambient fields for use in performing common-mode rejection. A write head can dynamically repair damaged or erased regions detected by the magnetic-field sensors. Energized by a battery-backup power source, the magnetic-field sensors and associated circuitry can continue to track movement of the piston rod when the machinery is off.

24 Claims, 8 Drawing Sheets

U.S. PATENT DOCUMENTS

| | | | |
|---|---|---|---|
| 4,871,582 | A | 10/1989 | Miyabayashi |
| 4,904,937 | A | 2/1990 | Takahashi et al. |
| 5,471,736 | A | 12/1995 | Griebeler |
| 5,771,141 | A | 6/1998 | Ohtsuka et al. |
| 5,891,514 | A | 4/1999 | Ataka et al. |
| 6,001,446 | A | 12/1999 | Nakada et al. |
| 6,579,634 | B2 | 6/2003 | Saito |
| 6,764,757 | B1 | 7/2004 | Wu et al. |
| 6,813,105 | B2 * | 11/2004 | Takano ................... 360/17 |
| 6,815,098 | B2 * | 11/2004 | Matsunuma et al. ........ 428/828 |
| 6,846,581 | B2 | 1/2005 | Oikawa et al. |
| 6,989,669 | B2 | 1/2006 | Low et al. |
| 7,034,527 | B2 | 4/2006 | Low et al. |
| 7,259,553 | B2 * | 8/2007 | Arns et al. ............. 324/207.25 |
| 7,307,418 | B2 | 12/2007 | Low et al. |
| 2001/0006744 | A1 | 7/2001 | Saito |
| 2003/0118867 | A1 | 6/2003 | Koda et al. |

FOREIGN PATENT DOCUMENTS

| | | | |
|---|---|---|---|
| JP | 57-085193 A | 5/1982 | |
| JP | 59164406 A | 9/1984 | |
| JP | 61194625 | 8/1986 | |
| JP | 63241717 A | 10/1988 | |
| JP | 01309922 A | 12/1989 | |
| JP | 02-138508 A | 5/1990 | |
| JP | 03-015702 A | 1/1991 | |
| JP | 03265704 A | 11/1991 | |
| JP | 05-126508 A | 5/1993 | |
| JP | 05126508 A | 5/1993 | |
| JP | 06-295431 A | 10/1994 | |
| JP | 10-260059 A | 9/1998 | |
| JP | 11-336713 A | 12/1999 | |

OTHER PUBLICATIONS

Duda et al, Plasma Spray Decomposition of a Hard Magnetic Layer, Derwent, Acc-No. 2000-602835, 3 Pages.

Non-Final Office Action for U.S. Appl. No. 11/953,070 dated Jun. 13, 2008; 15 pages.

Non-Final Office Action for U.S. Appl. No. 11/409,576 dated Jul. 20, 2006; 16 pages.

Final Office Action for U.S. Appl. No. 11/409,576 dated Mar. 13, 2007; 17 pages.

Notice of Allowance for U.S. Appl. No. 11/409,576 dated Aug. 7, 2008; 4 pages.

Notice of Allowance for U.S. Appl. No. 11/258,308 dated Jan. 18, 2006; 5 pages.

Non-Final Office Action for U.S. Appl. No. 10/840,781 dated Jun. 20, 2005; 6 pages.

Notice of Allowance for U.S. Appl. No. 10/840,781 dated May 10, 2003; 5 pages.

* cited by examiner

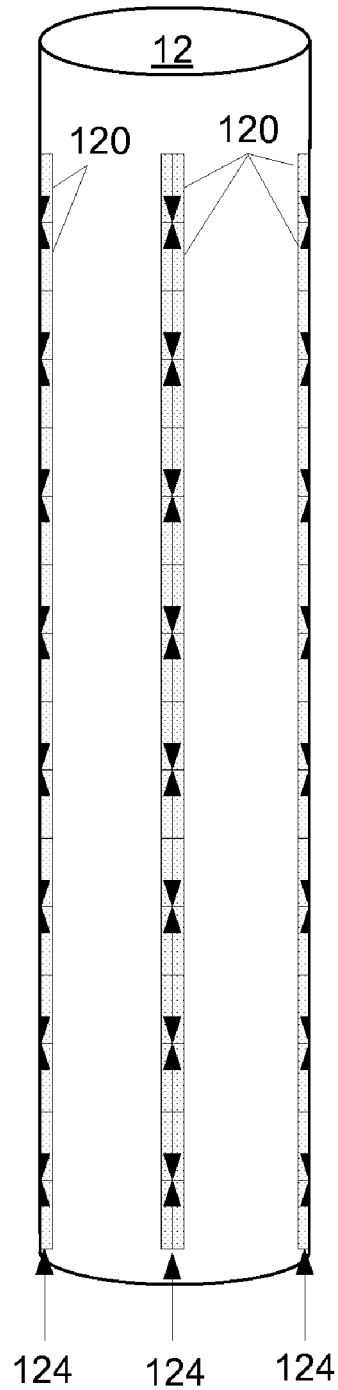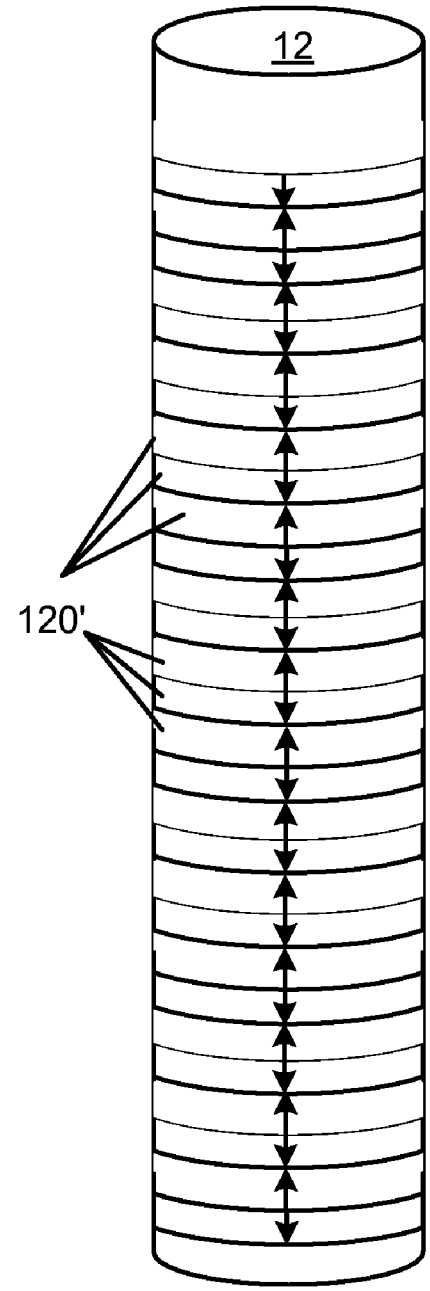
*FIG. 10A*   *FIG. 10B*

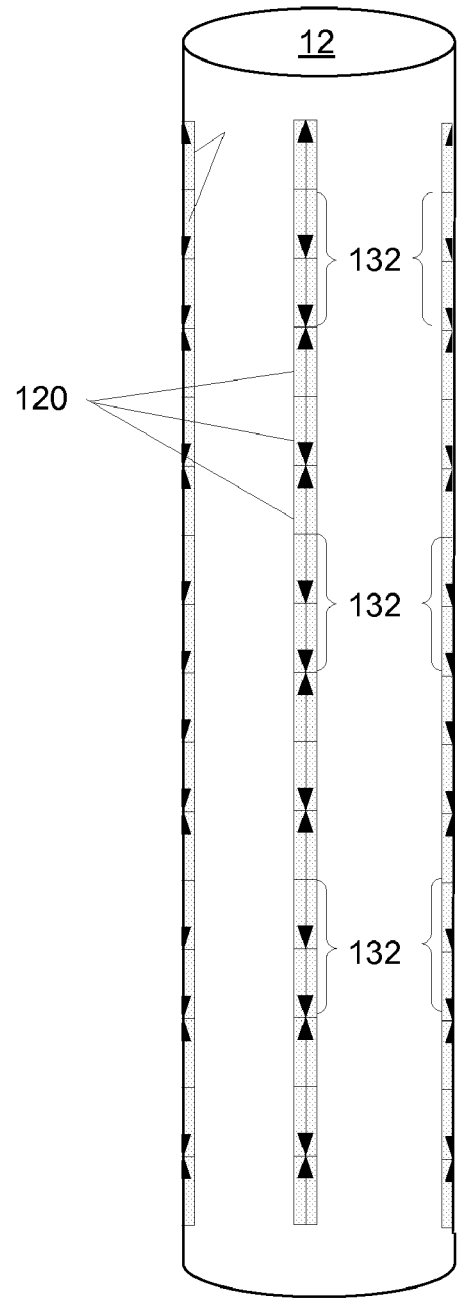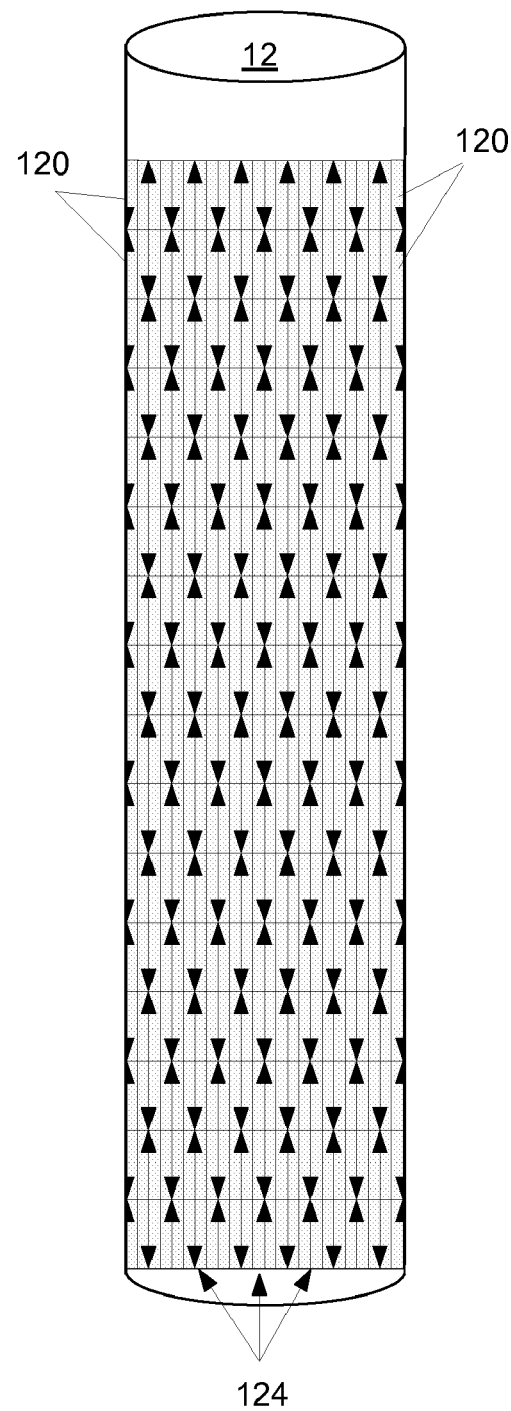
FIG. 10C
FIG. 10D

SYSTEM AND METHOD OF PERPENDICULARLY MAGNETIZING POSITION INFORMATION IN A MAGNETICALLY HARD LAYER OF A MOVING COMPONENT

RELATED APPLICATIONS

This application is a continuation application claiming the benefit of the filing date of co-pending U.S. patent application Ser. No. 11/782,005, filed Jul. 24, 2007, titled "System and Method of Magnetically Sensing Position of a Moving Component," which is a continuation application of U.S. Pat. No. 7,295,993, issued Aug. 21, 2007, the entireties of which U.S. patent application and patent are hereby incorporated by reference herein.

FIELD OF THE INVENTION

The invention relates generally to transducers for magnetically sensing position of a first component relative to a second component. More particularly, the invention relates to a system and method of magnetically sensing the position of a piston rod moving relative to a cylinder based on information recorded in a magnetic film on the piston rod.

BACKGROUND

Various industrial and mobile applications use hydraulic cylinders to control the movement and position of machinery. In general, these cylinders include a cylinder barrel within which a piston is arranged for reciprocating motion along an axis. A piston rod is secured at one end to the piston. The piston rod extends out of one end of the cylinder barrel along the axis of motion. The end of the piston rod that is external to the cylinder barrel is coupled directly or indirectly to a machine component. The piston divides the cylinder barrel into separate chambers. Fluid entering one of the chambers causes the piston and, thus, the piston rod to move relative to the housing. This movement of the piston rod drives the movement of the machine component.

Precise control of the position of the piston is generally fundamental to controlling the operation of the machinery. Measuring the position or velocity of the piston relative to the cylinder is often needed to achieve such control using conventional feedback control techniques. Accordingly, industry has produced various mechanical, magnetic, acoustic, and optical techniques for detecting the instantaneous position of the moving piston or piston rod.

Many position detection systems are expensive, cumbersome, or difficult to mount on the cylinder. Further, position detection systems for hydraulic cylinders often operate in harsh environments caused by internal conditions, such as pressurized fluid that drives the motion of the piston, and external conditions, such as dust and debris. Some types of position detection systems, such as Linear Variable Differential Transformers (LVDTs) and linear scales, can be unreliable or easily damaged in a harsh environment.

Some techniques entail encoding piston rod positions on the piston rod itself, and reading the encoded positions as the piston rod moves past a reference point, using a reading technique, e.g., optical, magnetic, mechanical, suited to the particular type of encoding. Some known techniques cut grooves, etch recesses, or marks in the rod. Such modifications, however, can adversely affect the rod's strength. Another known technique, described in the UK Patent Application No. GB 2 096 421, is to encode the position information magnetically in the rod material of the piston rod. In this UK patent application, the piston rod is constructed of steel and can be magnetized. However, this rod material is magnetically "soft." Magnetically soft material has low coercivity, which is a measure of difficulty for magnetically encoding and erasing information in that material. Thus, the position information encoded in rod material with low coercivity is subject to accidental erasure or alteration.

SUMMARY

In one aspect, the invention features a position-sensing system, comprising a cylinder, a piston rod movably coupled to the cylinder for movement with respect thereto, and a magnetically hard layer formed on the piston rod to provide a recording medium. A plurality of regions of the magnetically hard layer is perpendicularly magnetized to provide an encoding scheme for determining a position of the piston rod relative to the cylinder. A plurality of magnetic-field sensors is coupled to the cylinder in proximity of the magnetically hard layer to sense the perpendicularly magnetized regions while the piston rod is moving with respect to the cylinder. At least two of the magnetic-field sensors being axially positioned to sense the same set of magnetized regions in succession and to generate signals in response to the sensed magnetized regions that can be used to determine a position of the piston rod.

In another aspect, the invention features a method for sensing a position of a piston rod moving relative to a cylinder. The method comprises forming a magnetically hard layer on the piston rod to provide a recording medium for storing information. Information is perpendicularly magnetized at a plurality of regions of the magnetically hard layer. A plurality of magnetic field sensors read the same perpendicularly magnetized regions of the magnetically hard layer while the piston rod is moving relative to the cylinder. Output signals are generated by the plurality of magnetic field sensors from which a position of the piston rod with respect to the cylinder can be determined.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 10A is a diagram of a rod coated with a magnetically hard layer having a plurality of magnetized regions that provide a relative encoding scheme for use in determining the position of the rod.

FIG. 10B is a diagram of a rod with a magnetically hard layer having a plurality of magnetized rings around the circumference of the rod that provide a relative encoding scheme for use in determining the position of the rod.

FIG. 10C is a diagram of a rod with a magnetically hard layer having regions encoded to provide an absolute encoding scheme in combination with a relative encoding scheme.

FIG. 10D is a diagram of a rod with a magnetically hard layer having regions encoded in a checkerboard pattern to provide axial and radial magnetic transitions along the rod.

DETAILED DESCRIPTION

Figure 1:
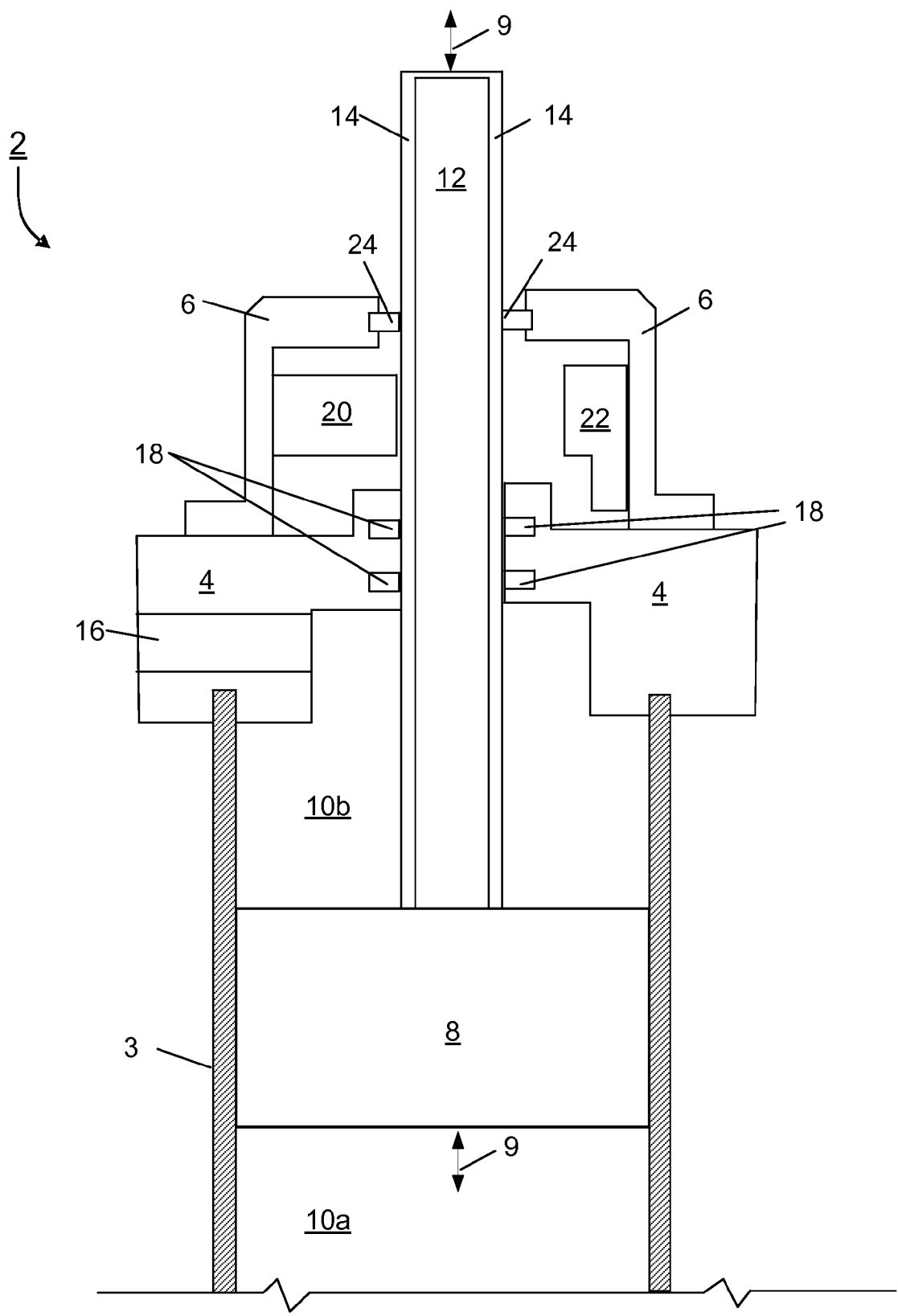
FIG. 1 is a cross-section view of an embodiment of a cylinder, including a piston, a piston rod, a magnetically hard layer on the piston rod, and a flux-sensing apparatus adjacent the magnetically hard layer.

In general, the present invention features a position-sensing system for magnetically sensing position, distance traveled, velocity, acceleration, and direction of motion of a first component with respect to a second component. In general, components are parts or elements of a system or of an assembly, examples of which include, but are not limited to, machines, equipment (e.g., backhoes), vehicles (e.g., tractors), tools, and conveyors. Systems that can embody the invention include, but are not limited to, hydraulic systems, pneumatic systems, vibration and shock damper systems, and measurement systems for precision machinery. Various vehicular or machine data buses can employ the invention to provide open-loop sensing, closed-loop feedback system control, or combinations thereof. Other types of positioning systems, such as GPS (Global Positioning Systems), can integrate functionality for detecting the location and distance of a machine with the functionality of the position-sensing system for detecting and controlling the machine's motion.

In a specific embodiment, the position-sensing system includes a piston rod (or cylinder rod) that moves relative to an actuating cylinder. In accordance with the principles of the invention, a physically and magnetically hard material coats a portion of the piston rod. With the use of standard magnetic recording techniques, information is recorded in this coating layer (or film) of magnetically hard material in the form of magnetic bits, dots, or marks (also referred to generally as a magnetic encoding). This position-sensing system uses this recorded information to determine the position of the piston rod. As used herein, magnetically "hard" material is material with high coercivity. Magnetic material of high coercivity requires considerable energy to magnetize, i.e., record, information, but also to demagnetize recorded information. This magnetization of the encoding within the magnetically hard layer can occur longitudinally or perpendicularly. In one embodiment, longitudinally magnetized encoding is employed without there being a non-magnetic layer between the magnetically hard layer and the piston rod.

One or more flux-sensitive magnetic read heads or sensors, mounted in, on, or near an end cap of the cylinder, sense the magnetic encoding while the piston rod moves past. Circuitry in communication with the read sensors can process and store the information obtained from the magnetic encoding to determine the instantaneous incremental position of the piston rod, its velocity, acceleration, and direction of motion (i.e., linear, rotational, or both) relative to the cylinder. In addition, the circuitry can produce a signal, representing any of such positional information, for display or for use in controlling position or movement of the machine or of a component thereof.

Various encoding techniques use relative encoding to record position information in the magnetically hard layer on the piston rod. One such technique includes evenly spaced marks magnetically recorded in a track or column that extends axially, i.e., along a length, of the piston rod. A read sensor detects magnetic transitions between adjacent magnetic marks. With reference to a zero position, circuitry cumulatively counts magnetic transitions detected by a read sensor and remembers the linear (and/or rotational) position of the piston rod based on the count. Magnetic patterns other than evenly spaced marks can also reside in the magnetically hard layer, in combination with the evenly spaced marks, for auxiliary functions, e.g., for signifying a key position on the piston rod or for identifying a particular event.

In one embodiment, two or more spatially separated serial read sensors read the magnetic marks of one track. Flux concentrators near the read sensors can improve the sensing of the flux of the magnetic bits. From phase differences in signal outputs produced by the read sensors, the circuitry can identify the linear and rotational position, traveled distance, velocity, acceleration, and direction of motion of the piston rod. Other read sensors can be used to sense ambient flux for use in common-mode rejection computations. When power to a machine employing the invention is off, the read sensors and read-head electronics circuitry can continue to receive power from an auxiliary power supply (e.g., a battery). Consequently, the read sensors can continue to detect motion if the piston rod drifts, and the circuitry can continue to compute the piston rod position, while the machine is off. Then, when the machine begins to operate again, the circuitry knows the current position of the piston rod without any need of calibration.

To protect against accidental or intentional erasure of information recorded in the magnetically hard layer, the position-sensing system of the invention can employ redundancy in the form of evenly sized magnetized rings that each encircle the piston rod or in the form of duplicate longitudinal tracks or columns extending axially on the piston rod. Redundant read sensors disposed about the circumference of the piston rod can each sense the rings or marks of a different track. A voting mechanism can determine which read sensor or sensors are detecting valid information and which information to use. In one embodiment, the position-sensing system integrates a write-head with the read sensors so that if a read sensor detects an erased or failing magnetic ring or mark, the write-head can dynamically repair the encoding.

Although herein described primarily with respect to cylinders and piston rods, practice of the invention can involve various other types of components. In general, the invention can be embodied by any two surfaces that move sufficiently near each other so that magnetic-field sensors on one surface can detect a magnetic recording in a magnetically hard layer on the other surface. For example, the components can comprise two planar surfaces, with implementation of the magnetically hard layer occurring on a first planar surface and the read sensors occurring on a second planar surface. As another example, the components embodying the position-sensing system of the invention can include a machine component that is actuated by the piston rod. The position, direction of movement, distance traveled, velocity, or acceleration of the actuated machine component can be correlated to the position, direction of movement, distance traveled, velocity, or acceleration of the actuator (i.e., the piston rod).

FIG. 1 shows a cross-sectional side view of an embodiment of position-sensing system having a cylinder 2, including a cylinder barrel 3, a cylinder end cap 4 (also called a "packing gland"), and a housing 6. A piston 8 is arranged within the cylinder barrel 3 for reciprocating motion along an axis 9. The piston 8 partitions the cylinder barrel 3 into two chambers 10a and 10b. One end of a piston rod 12 is secured to the piston 8. The piston rod 12 extends along the axis 9 of motion. The other end of piston rod 12 extends out of the housing 6 through the end cap 4, and may be coupled directly or indirectly to a machine component. Typically, the piston 8 and piston rod 12 are constructed of a ferromagnetic material (e.g., steel), although a non-magnetic piston rod can be used to practice the invention. In the embodiment shown, the piston rod 12 is cylindrical; other piston rod shapes can be employed without departing from the principles of the invention.

A magnetically hard film or layer 14 coats the piston rod 12 to provide a recording medium. This coating can be continuous or discontinuous on the piston rod 12 and cover a portion or all of the piston rod 12. For example, typically the magnetically hard layer 14 is not formed on the end of the piston rod 12. Regions of the magnetically hard layer 14 along a length of the piston rod 12 are magnetized. Each magnetized region is an area of aligned magnetic dipoles. Such magnetized regions may be referred to herein, individually or collectively, as magnetic bits, dots, marks, patterns, or encoding. The magnetized regions are used to determine a position of the piston rod 12 with respect to the cylinder 2, as described in more detail below.

The end cap 4 has a channel 16 for the passage of fluid (e.g., oil, water, steam, gas) into and out of the chamber 10b, for moving the piston 8. A fluid passageway to the other chamber 10a is not shown. Seals 18 within the end cap 4 are arranged to lie flush with a surface of the piston rod 12 and thus prevent fluid from leaving the chamber 10b.

The housing 6 encloses a flux-sensing apparatus 20—comprising one or more read heads or sensors—and read-head electronics 22. The read sensors of the flux-sensing apparatus 20, also referred to as magnetic-field sensors, can be arranged to sense a magnetic field gradient axially along the surface of the piston rod and radially along the radius of the piston rod. Each read sensor of the flux-sensing apparatus 20 can be, for example, a Hall-effect device, a coil, a magnetoresistive (MR) sensor, or a giant magnetoresistive (GMR) sensor, such as a NVE AB-002-00 read sensor produced by NVE Corporation of Eden Prairie, Minn. GMR sensors, for example, are available in dual-inline packages (DIP) that are approximately 3 mm by 3 mm by 1 mm in size). These read sensors can remotely sense the magnetized regions of the magnetically hard layer through non-magnetic layers, whether metallic, such as chrome, or non-metallic, such as plastic.

The location of the flux-sensing apparatus 20 within the housing 6 provides protection from the environment and permits ready access for easy replacement (i.e., the housing 6 can be removed without removing the end cap 4 from the cylinder 2). The flux-sensing apparatus 20 is mounted in the housing 6 within proximity of the piston rod's surface to permit sensing of the encoding recorded in the magnetically hard layer 14. Machining away part of the DIP housing of a read sensor, or packaging the read sensor in a package type other than a DIP, can more closely position the read sensor to the magnetically hard layer 14 for detecting greater amounts of flux from the magnetic encoding. Although shown in FIG. 1 to be on only one side of the piston rod 12, the flux-sensing apparatus 20 can encircle the piston rod 12 within the housing 6. The housing 6 also includes a rod wiper 24 for wiping away small magnetizable particles that may adhere to the piston rod 12. In another embodiment, the end cap 4 houses the flux-sensing apparatus 20 and read head electronics 22. In such an embodiment, the housing 6 is optional because the end cap 4 can protect the read head 20 from the harsh operating environment.

In brief overview, fluid within the chambers 10a, 10b at time-varying, differential pressures causes the piston 8 and thus the piston rod 12 to move in and out relative to the flux-sensing apparatus 20. The flux-sensing apparatus 20 reads the recorded magnetic encoding on the piston rod 12 and produces corresponding analog or digital signals. From these signals, the read-head electronics 22 can determine and store the position, distance traveled, velocity, acceleration, and direction of motion of the piston rod, or any combination thereof. In addition, the read-head electronics 22 can produce a signal, representing any of such positional information, for display or for use in controlling position or movement of the machine or a component thereof.

Figure 2:
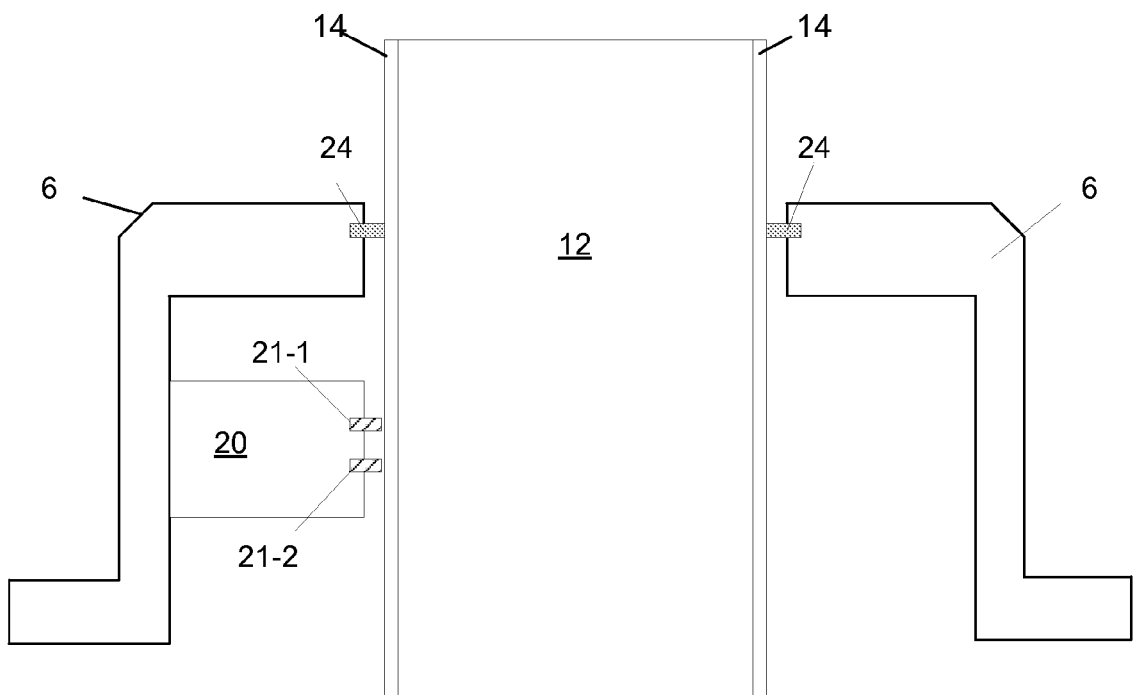
FIG. 2 is a cross-section view of the cylinder illustrating one embodiment of the flux-sensing apparatus having a plurality of spatially separated read sensors for reading information magnetically recorded in the magnetically hard layer.

FIG. 2 shows the housing end of one embodiment of a position-sensing system, in which the flex-sensing apparatus 20 includes a plurality of read sensors 21-1, 21-2 (generally, 21) positioned serially to read the same portion (i.e., track) of magnetically recorded regions in the magnetically hard material 14, while the piston rod 12 moves linearly in and out of the cylinder 2. The read sensors 21 are disposed axially and separated by a known distance (e.g., 0.5 mm). From signals produced by the read sensors 21, the read-head electronics 22 can compute the axial distance of the piston rod 12 independently of the absolute value of the signals. Such computations are based on the ratio between the signals produced by each read sensor 21. For example, if the spacing between magnetic transitions on the piston rod is 1 mm, each read sensor 21 produces a sinusoidal output signal having a peak amplitude every 1 mm. Because of the spacing between adjacent read sensors, the sinusoidal output signals produced by such read sensors have a separation in phase corresponding to their spatial separation. From the ratio of these output signals, the read-head electronics 22 can establish the linear position of the piston rod at finer resolution than 1 mm. In addition, from the phase differences in the sinusoidal output signal, the read-head electronics 22 can also determine the rotational position of the piston rod 12. Although FIG. 2 shows only two read sensors 21-1, 21-2, it is to be understood that more than two serially positioned read sensors can be used in the practice of the invention.

Figure 3:
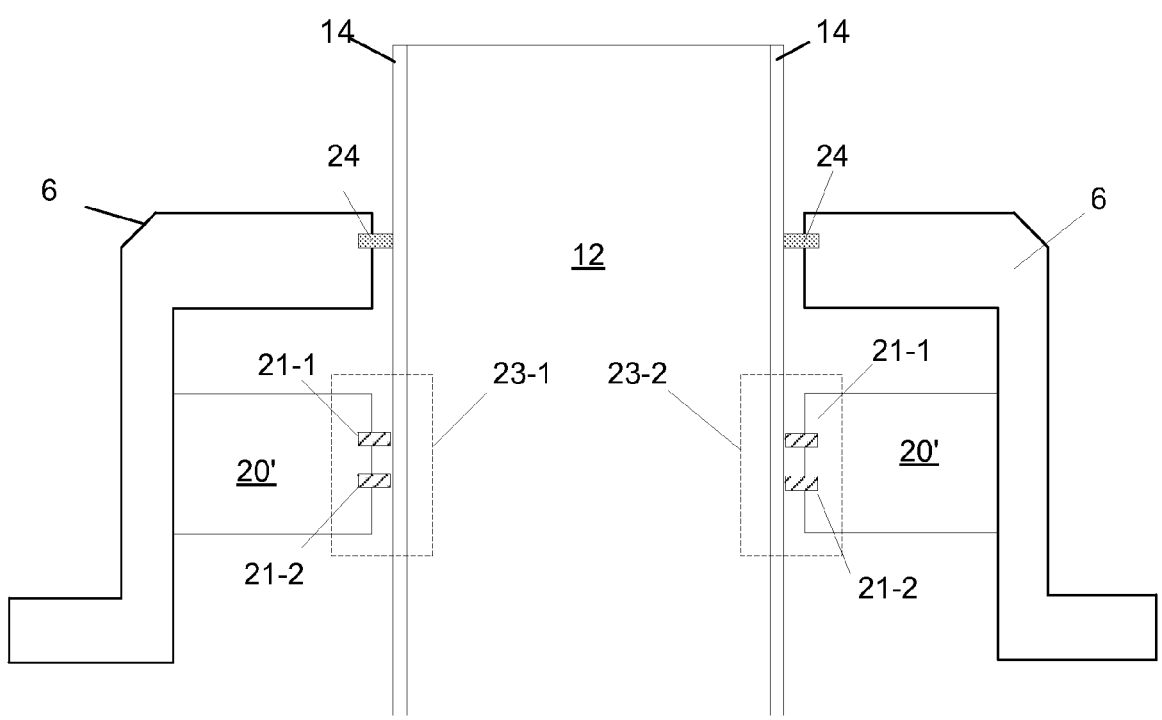
FIG. 3 is a cross-section view of the cylinder illustrating another embodiment of the flux-sensing apparatus having redundant tracks of spatially separated read sensors.

FIG. 3 shows another embodiment of the flex-sensing apparatus 20' that can be used in the position-sensing system of FIG. 1. The flex-sensing apparatus 20' includes sets 23-1, 23-2 (generally 23) of serially positioned, axially spaced-apart read sensors 21-1, 21-2 (generally 21). Here, the sets 23 are on opposite sides of the piston rod 12 (i.e., separated by 180°). In other embodiments, there can be more than two sets 23 of read sensors. In addition, the separation between the sets 23 of read sensors 21 can be other than 180°.

Depending upon the pattern encoded in the magnetically hard layer, the separate sets 23 of read sensors 21 can sense the same magnetized regions (from different vantage points) or different magnetized regions that have been magnetically recorded with identical and, thus, redundant information. The read-head electronics 22 can employ a voting or election mechanism between (or, for more than two, among) corresponding read sensors 21, i.e., those read sensors concurrently sensing the same magnetized region or redundant magnetized regions. The voting or election mechanism determines which output signals from the read sensors 21 to use for determining the current position of the piston rod 12. As an example, the mechanism can average the output signals of the read sensors, discarding any reading clearly deviating from valid values. Accordingly, the read-head electronics 22 can also determine which magnetized regions have become erased or damaged and, if integrated with a write head, as described below, cause re-magnetization of such regions. The additional tracks of read sensors provide redundancy, reliability, and resistance to damage.

Figure 4:
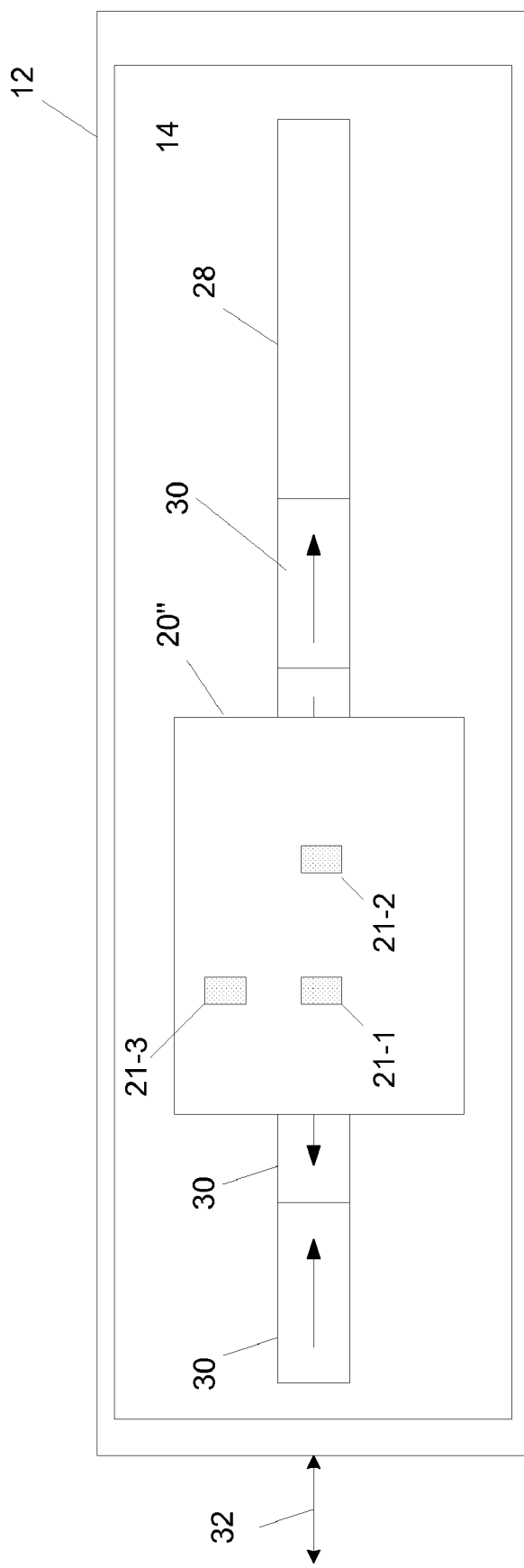
FIG. 4 is a diagrammatic top view of an embodiment of a flux-sensing apparatus with a plurality of serially positioned read sensors and a radially positioned read sensor for sensing rotational movement of the piston rod.

FIG. 4 shows a top view of another embodiment of the flux-sensing apparatus 20" including the plurality of serially positioned read sensors 21-1, 21-2 (FIG. 2) and another radially positioned read sensor 21-3. In this exemplary embodiment, the read sensor 21-3 is positioned adjacent the read sensor 21-1, separated from the read sensor 21-1 by a known distance (e.g., 0.5 mm). As shown, the serially positioned read sensors 21-1, 21-2 are positioned over a track 28 of magnetized regions 30. The read sensor 21-3, which is at a same distance from the magnetically hard layer 14 as the other read sensors 21-1, 21-2, is positioned alongside the track 28. Other embodiments can position the read sensor 21-3, for example, adjacent to the other read sensor 21-2 or equidistant to the read sensors 21-1, 21-2. Still other embodiments can have another radially positioned read sensor, positioned adjacent to the read sensor 21-2 and serially aligned with the first radially positioned read sensor 21-3.

The embodiment shown in FIG. 4 is particularly suited for sensing rotational movement of the piston rod 12, while the piston rod 12 moves in the direction indicated by the arrow 32 relative to the flux-sensing apparatus 20". The read-head electronics 22 (FIG. 1) computes linear position and rotational position of the piston rod 12 based on the output signals of each of the read sensors 21-1, 21-2, and 21-3. If the piston rod 12 rotates, the read sensor 21-3 senses the magnetized regions 30 more strongly, or more weakly, depending upon the direction of rotation. The read-head electronics 22 can determine the degree of rotation based on the known distance of the read sensor 21-3 from the read sensor 21-1 and on the ratio of their output signals.

Common-Mode Rejection

Figure 5:
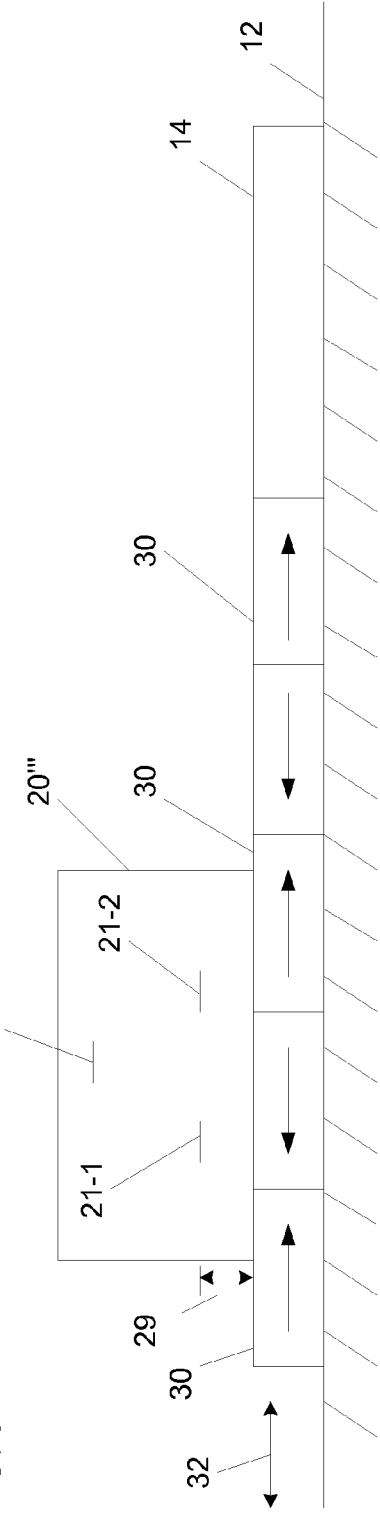
FIG. 5 is a diagrammatic side view of still another embodiment of the flux-sensing apparatus, including a read sensor for sensing ambient fields, the read sensor being disposed at a greater distance from the magnetically hard layer than the spatially separated read sensors that read the information magnetically recorded in the magnetically hard layer.

The ferromagnetic substrate of the piston rod 12 below the magnetically hard layer 14 may become magnetized and generate a field that interferes with the magnetic fields of the regions magnetically recorded in the magnetically hard layer 14. One embodiment of the position-sensing system uses common-mode rejection (CMR) to negate the effect of ambient fields on those read sensors 21 reading the magnetized regions. FIG. 5 diagrammatically shows an example of a flex-sensing apparatus 20''', in which a CMR read sensor 21' is positioned at a greater distance from the magnetically hard layer 14 than the read sensors 21-1, 21-2. The CMR read sensor 21' is, in one embodiment, approximately ten times the distance of the primary read sensors 21-1, 21-2 from the piston rod, whereas the read sensors 21-1, 21-2 are at a distance 29 near enough to the magnetically hard layer 14 to sense the magnetic fields of the magnetized regions 30 while the piston rod 12 moves by in the directions indicated by double-headed arrow 32.

Being far enough from the magnetically hard layer 14 not to sense strongly the magnetic fields of the magnetized regions 30, the CMR read sensor 21' predominantly senses ambient fields. The read-head electronics 22 uses the signals produced by the CMR read sensor 21' to cancel out interference from an ambient field upon the magnetic fields sensed by the read sensors 21-1, 21-2. Thus, the common-mode rejection of magnetic fields produced by a magnetization of the ferromagnetic substrate enables high resistance to interfering ambient fields. Although only one CMR read sensor 21' is shown, the invention can be practiced with multiple such CMR read sensors. For example, one embodiment has a CMR read sensor 21'—used for sensing an ambient field—for each read sensor 21 used to sense the magnetically recorded regions.

Flux Concentrator

Figure 6:
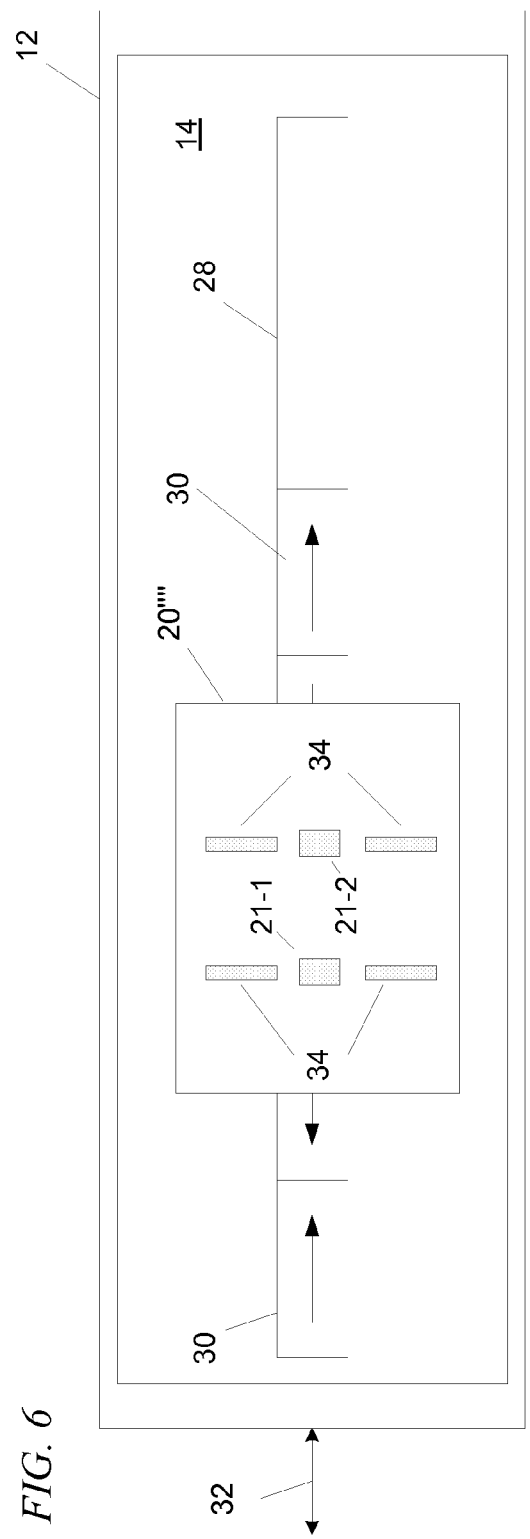
FIG. 6 is a diagrammatic top view of an embodiment of a flux-sensing apparatus with a read sensor for reading information magnetically recorded in the magnetically hard layer and flux concentrator for collecting and directing flux to the read sensor.

FIG. 6 shows a top view of an embodiment of the flux-sensing apparatus 20"" in which a flux concentrator 34 is fabricated on each side of or around each read sensor 21-1, 21-2, to enhance the sensing of the magnetized regions 30. Made of magnetically soft, i.e., low coercivity, material, each flux concentrator 34 collects the flux of the magnetized region 30 from around the circumference of the piston rod 12 and directs the collected flux to the read sensor 21 with which that flux concentrator 34 is associated. Collecting flux from the circumference of the piston rod 12 makes each read sensor 21 insensitive to the angular position of the read sensor 21 relative to the magnetized region 30 and boosts the signal. An advantage stemming from the use of flux concentrators is that the construction of the magnetically hard layer 14 can be thinner than would be otherwise. In addition, the stronger the magnetic signal that a read sensor can derive from the magnetically hard layer 14, the farther away the read sensor can be from the magnetically hard layer.

Figure 7A:
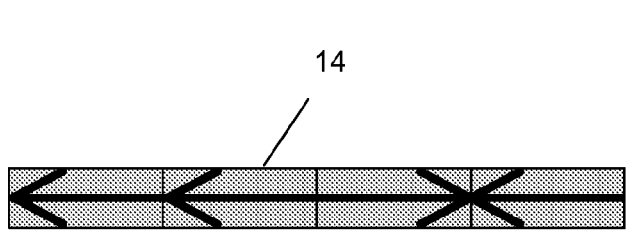
FIG. 7A and FIG. 7B are simplistic diagrammatic views of two techniques for magnetically recording information in the magnetically hard layer on the piston rod.
Figure 7B:
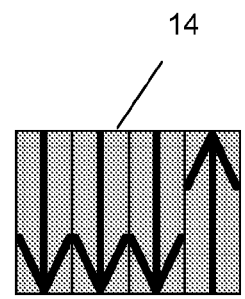

FIG. 7A and FIG. 7B are diagrammatic views of two standard magnetic recording techniques for magnetically recording information in the magnetically hard layer 14 of FIG. 1. A write transducer (i.e., a pole write head) can magnetize the magnetically hard layer 14 with an identifiable magnetic pattern in one of two standard ways: 1) longitudinal; and 2) perpendicular. When a current is applied to the write transducer, an external field is generated, thereby aligning the magnetic domains within the magnetically hard layer 14. Write transducers are currently able to record on the order of tens of megabits per square inch.

In longitudinal media, the magnetization lies in the plane of the magnetically hard layer 14, which is shown in FIG. 7A as left and right arrows. The magnetic pattern of longitudinal recording media consists of "transitions," i.e., reversals of the in-plane magnetization from one polarity to the other. Such a reversal is marked by the existence of magnetic poles whose stray flux is sensed by a read head located above the medium. In perpendicular media, the magnetization is perpendicular to the plane, shown as up and down arrows in FIG. 7B. Here, the magnetic marking occurs by creating transitions between regions magnetized "up" and "down."

Longitudinal and perpendicular recording media can both be produced by electrochemical methods (e.g., electroless plating, electroplating, chemical vapor deposition, and electrochemical deposition (sputtering)) or by means of adhesive layers or strips of magnetic tape. For longitudinal and perpendicular recording media, the materials used are often cobalt-based alloys. Pure cobalt (Co) can be used to produce a magnetic film of high coercivity, but alloying elements are typically used to tailor the magnetic properties of the recording media and to increase its coercivity. Examples of alloying elements include group VA (P, As, Sb, Bi), group VIB (Cr, Mo, W) elements, and the noble elements Pt and Pd. For longitudinal media, example alloys include Co—P, Co—Ni—P, Co—W, and Co—Mo. For perpendicular media, example alloys include Co—P, Co—W, and Co—Cr. Approximate high coercivity values obtained from using such Co-based alloys range from 1-2 kOe. Embodiments of the magnetically hard layer 14 can be synthesized with such materials to produce a magnetic layer with high coercivity. In a preferred embodiment, the magnetically hard layer 14 is made of a CoNiP alloy. With a CoNiP alloy, the magnetically hard layer 14 can be synthesized for either perpendicular or longitudinal recording.

For longitudinal media, for instance, a ferromagnetic substrate can pose a problem for information retention. Being magnetically permeable, the ferromagnetic substrate provides a low reluctance path for the flux. Consequently, longitudinal recording can exhibit a reduced level of magnetic flux to be sensed and has generally required the use of a non-magnetic layer between the magnetically hard layer 14 and the ferromagnetic piston rod 12 to prevent the loss of the available flux. A non-magnetic alloy, for example, such as nickel-phosphorous (NiP), disposed between the piston rod 12 and the magnetically hard layer 14, can improve the amount of flux available for sensing. The use of CoNiP for the magnetically hard layer 14 of the invention, however, enables longitudinal recording without the need of such an intervening non-magnetic layer, although use of the non-magnetic layer is still advantageous.

Magnetic layers or films of high coercivity, such as the magnetically hard layer 14, can maintain recorded information under external stray fields and under the demagnetization fields deriving from the imposed magnetic transitions. This magnetically hard layer 14 may also provide good mechanical and corrosion resistance. However, considering the harsh operational environment of the cylinder 2, the magnetically hard layer 14 can be coated to insure sufficient resistance to mechanical wear and corrosion. One example of such a protective layer can be hard chrome, i.e., a Cr layer. Notably, a chrome protective layer exhibits strong adhesion to a CoNiP magnetically hard layer 14 (similar to the strength of adhesion of chrome to steel).

FIGS. 8A-8D show cross-sectional views of various embodiments of layering geometries, including a substrate 50 (e.g., the piston rod), an optional intermediate layer 52, the magnetically hard layer 14, and an optional protective layer 54. The layers 14, 52, and 54 can cover all or a portion of the piston rod 12. For example, the magnetically hard layer 14 (and the optional layers 52, 54) are not typically applied to the end of the piston rod 12, in particular, to those one or more portions of the piston rod 12 that do not pass near enough to a read head for sensing.

Generally, the substrate 50 can be magnetic or non-magnetic, e.g., although typically ferromagnetic (e.g., a steel rod), the piston rod 12 can be constructed of non-magnetic material (e.g., plastic, aluminum, ceramic, or glass) without departing from the principles of the invention. In each of the embodiments, the recording media (i.e., the magnetically hard layer 14) is comprised a high coercivity magnetic material, such as CoNiP, and the optional protective layer 54 is made of chrome. The composition of the optional intermediate layer 52 depends upon the type of the recording media and of the substrate material.

Figure 8A:
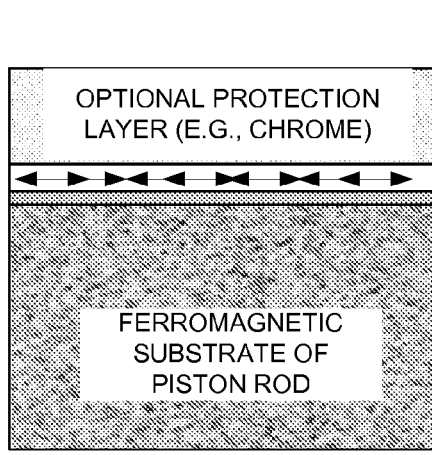
FIGS. 8A-8D are cross-sectional views of layer geometries for different embodiments of piston rod construction, each embodiment having a magnetic film that provides a recording medium for magnetically recording information.

FIG. 8A shows an embodiment in which the magnetically hard layer 14 is produced as longitudinal media and the substrate material is ferromagnetic. Here, the intermediate layer 52 can be a non-magnetic amorphous layer, such as Ni—P, to obstruct the low reluctance path through the substrate 50 and, consequently, to improve the magnitude of the flux being sensed and retention of the signal after being exposed to a strong magnetic field (e.g., from a permanent magnet). As described above, use of a non-magnetic intermediate layer 52 is optional when the magnetically hard layer 14 has a composition, such as CoNiP described above, that enables sufficient flux to be sensed despite any shunting of flux by the substrate 50.

Figure 8B:
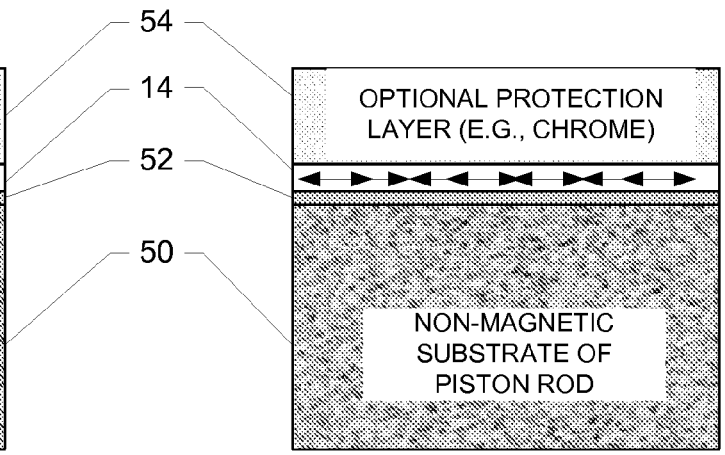

FIG. 8B shows an embodiment in which the substrate material is non-magnetic and the magnetically hard layer 14 serves as longitudinal media. Non-magnetic substrates lack the permeability of ferromagnetic substrates, and consequently have less need for a non-magnetic intermediate layer 52 than ferromagnetic substrates. Notwithstanding, a non-magnetic intermediate layer 52 can be used, with the advantages noted above.

Figure 8C:
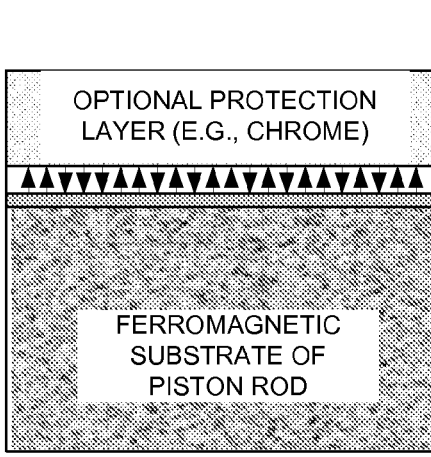

FIG. 8C shows an embodiment in which the magnetically hard layer 14 provides perpendicular media and the substrate is made of a ferromagnetic material. For perpendicular media, the permeability of a ferromagnetic substrate serves an advantage. The return path in a ferromagnetic substrate between adjacent oppositely magnetized regions does not affect the stray flux in the region above the magnetically hard layer 14, and assists in the write process and in the retention of the written information. Here, too, the use of an intermediate layer 52 is optional, although a magnetically soft intermediate layer 52 can mask unreliable or non-uniform permeability of the ferromagnetic substrate 50, and therefore its presence can be beneficial.

Figure 8D:
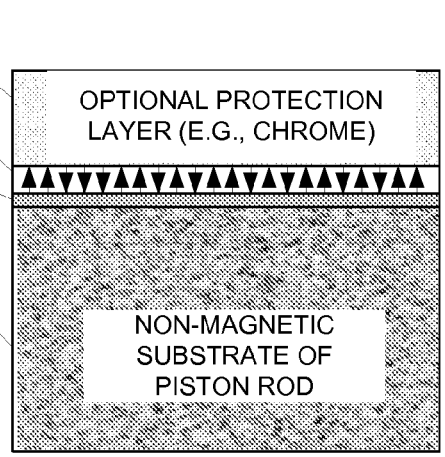

FIG. 8D shows an embodiment in which the magnetically hard layer 14 provides perpendicular media and the substrate 50 is made of a non-magnetic material. Non-magnetic substrates lack the beneficial properties of permeability for information retention. To improve the information retention of perpendicular media on non-magnetic substrates, the intermediate layer 52 can be constructed as a magnetically soft layer (e.g., permalloy or Ni—Fe).

Each of the FIGS. 8A-8D also shows the relative thicknesses of the layers 14, 52, and 54 on the substrate 50 of the piston rod 12. In each illustrated embodiment, the magnetically hard layer 14 is approximately 5 um thick, the optional intermediate layer 52, when present, is approximately 1-10 um thick, and the optional protective layer 54, when present, is approximately 40 um thick. The thickness of the protective layer 54 affects the resolution of the piston rod position sensing system by limiting how near the read heads can be to the magnetically hard layer 14. For example, with a 40 um thick protective layer 54, magnetically recorded marks may need to be spaced apart by at least 40 um (approximately) for the read heads to be able to distinguish between them. In embodiments without the protective layer 54, the marks can be located more closely together because the read heads can be nearer to the encoded magnetically hard layer 14. The particular thicknesses shown in FIGS. 8A-8D provide illustrative examples; other thicknesses for the layers 14, 52, and 54 can be used to practice the invention.

Figure 9:
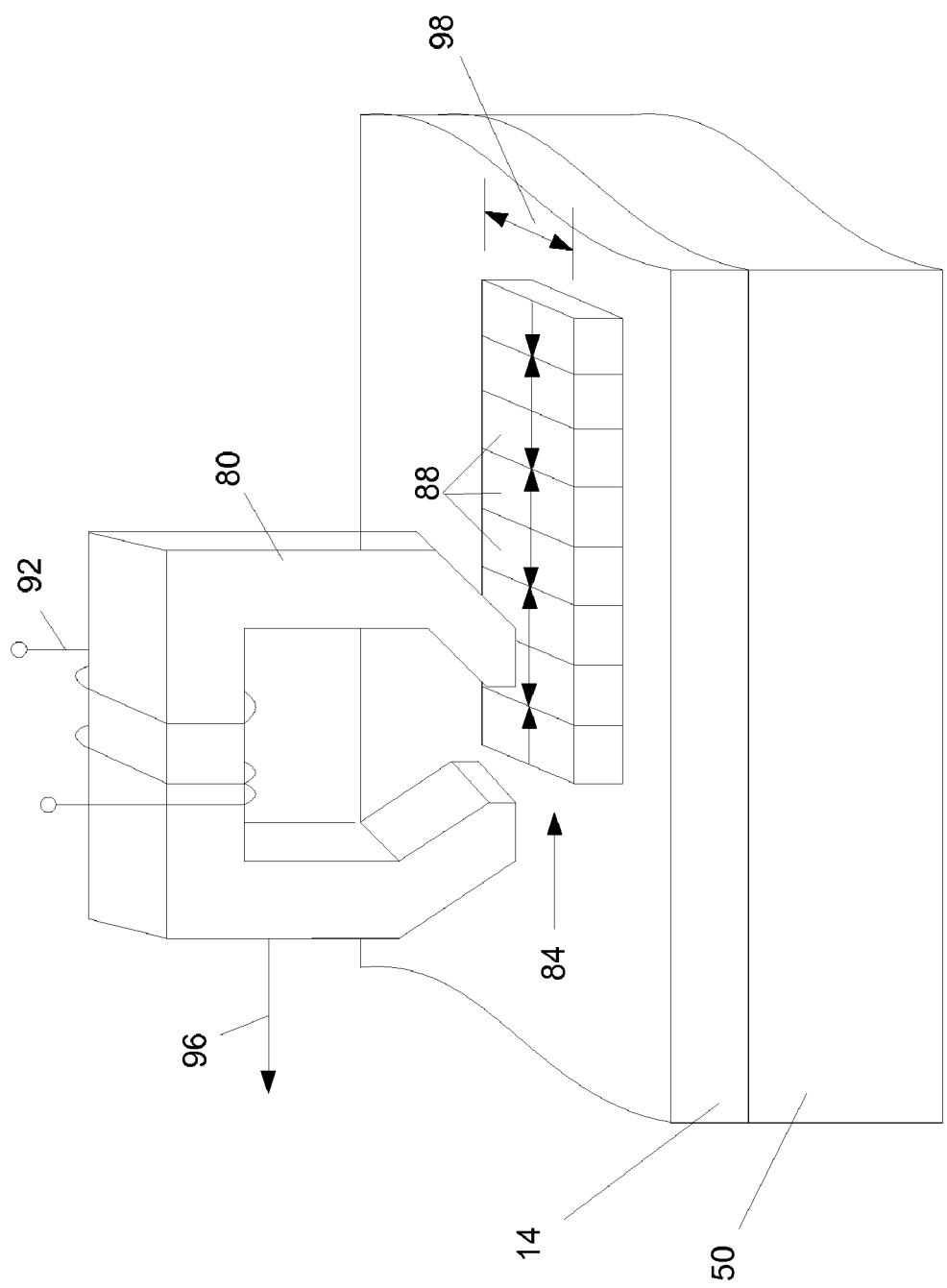
FIG. 9 is a diagram of an embodiment of a write head for magnetically recording information in the magnetically hard layer.

FIG. 9 shows diagrammatically a process in which a write head 80 writes a series 84 of regions 88 to the magnetically hard layer 14 along a length of the substrate 50. Magnetically recording the encoding in the magnetically hard layer 14 can occur before installation of the cylinder 2 into the particular machinery or during operation of the cylinder 2, as described further below. In one embodiment, the write head 80 is of the kind typically used for magnetic tape recording, which is a longitudinal recording medium. World Magnetics, Inc. of Traverse City, Mich.) produces write heads that can be used to practice the invention. An electrical current flowing through a coil 92 generates a magnetic field in the write head 80. The magnetic field is strongest in the gap above the magnetically hard layer 14 and induces the magnetic domains in the magnetically hard layer 14 to align themselves as the write head moves relative to the substrate 50. Arrow 96 represents the direction of motion of the write head 80 relative to the substrate 50. Each region 88 is made of many magnetic domains, oriented as a group by the magnetic field from the write head 80. In one embodiment, the write head 80 is energized with 0.75 amperes of current to generate magnetized regions 88.

Position information can be recorded in the magnetically hard layer 14 of the piston rod 12 in a multitude of ways. Some techniques explicitly record the identities of the absolute piston rod positions on the piston rod 12 (e.g., using binary code), other techniques magnetize shapes or regions of the magnetically hard layer 14 from which piston rod positions can be computed, and still others use relative position techniques to determine the current location of the piston rod. Examples of techniques for recording absolute rod positions and for magnetizing shapes are described in U.S. patent application Ser. No. 10/840,781, filed May 6, 2004, titled "Systems and Methods of Recording Piston Rod Position Information in a Magnetic Layer on a Piston Rod," the entirety of which is incorporated by reference herein.

FIGS. 10A-10D illustrate different examples of patterns of magnetized regions 120 that implement relative encoding schemes. In each of these examples, the magnetized regions 120 are represented as being longitudinally recorded, i.e., in the plane of the magnetically hard layer 14, although it is to be understood that perpendicular recording can be used to practice the invention. FIG. 10A shows a plurality of redundant tracks 124 of identically sized magnetized regions 120 extending axially along a length of the piston rod 12. In one embodiment, each magnetized region 120 is approximately 1 mm in length and 1 mm in width. Within a given track 124, magnetization of the magnetized regions 120 occurs in an alternating pattern, i.e., every other magnetized region 120 has the same magnetic alignment. For magnetized regions 120 of 1 mm length, this alternating pattern produces a transition (i.e., polarity reversal) between neighboring regions 120 every 1 mm. The tracks are redundant in that the information that can be obtained from one given track is identical to the information that can be obtained from any of the other tracks: the tracks 124 are equal to each other in length, start at the same distance from one end of the piston rod 12, and have magnetic transitions at equal distances along the piston rod 12 so that read sensors aligned circumferentially around the piston rod can detect the transitions simultaneously. In addition, these tracks 124 can be evenly spaced around the circumference of the piston rod 12. For example, four tracks 124 of magnetized regions 120 evenly spaced around the circumference of the piston rod are 90 degrees apart.

Referring also to FIG. 3, one set 23 of read sensors 21-1, 21-2 is aligned over each track 124 and, while the piston rod 12 moves, each read sensor 21 senses the magnetized regions 120 of one of the tracks 124 and produces a corresponding sinusoidal output signal. The peak of each sinusoidal output signal occurs over the magnetic transition between adjacent magnetized regions 120, and the trough occurs approximately over the midsection of the each magnetized region. Accordingly, each set 23 of read sensors produces a plurality of sinusoidal output signals separated in phase, as described above. The redundant information of the tracks 124 should result in output signals of one set 23 of read sensors being similar in phase and amplitude to those output signals produced by each of the other sets 23 of read sensors (provided no magnetically recorded information in any of the tracks 124 is damaged or erased).

From the output signals, the read-head electronics 22 maintains a count of the sensed magnetized regions 120 (i.e., the transitions). As described above, the read-head electronics 22 can use an election mechanism to determine from the output signals produced by the sets 23 of read sensors that a transition has been sensed. The count can increment and decrement based on the current direction of oscillating motion of the piston rod 12. With reference to a designated zero-point on the piston rod 12, the read-head electronics 22 determines the absolute position of the piston rod from the current count. From the retained count of magnetized regions, the read-head electronics 22 can also determine distance traveled, speed, direction and acceleration of the piston rod. Although the computation of these parameter values can be obtained from a single track 124, the use of redundant tracks 124 increases the amount of information stored in the magnetically hard layer 14, and improves the reliability of measurement and robustness of the position-sensing system. In addition, the read-head electronics 22 can maintain a plurality of counts, e.g., one count for each read sensor, and another count that increments only, to maintain a cumulative count of distance traveled by the piston rod, etc.

Rotational movement of the piston rod 12 is another parameter that the position-sensing system can detect and monitor. In one embodiment, the read-head electronics 22 determines from the output signals the degree of rotation with respect to a designated zero-point position. In this embodiment, a count maintained by the read-head electronics corresponds to the extent the piston rod 12 has rotated within the cylinder 2 with respect to this zero-point position. The number of sets 23 of read sensors determines a degree of resolution for measuring the rotational position of the piston rod 12: the greater the number of read sensor sets, the finer the resolution. There may be more sets 23 of read sensors than tracks 124 of magnetized regions 120.

FIG. 10B shows another embodiment in which identically magnetized rings 120' encircle the circumference of the piston rod 12. The thickness (i.e., axial length) of each ring satisfies the required resolution for sensing. Similar to the tracks 124 of FIG. 10A, magnetization of the rings occurs in an alternating pattern, i.e., every other magnetized region 120 has the same magnetic alignment. A plurality of sets 23 of read sensors located around the piston rod 12 in the housing, as described above in connection with FIG. 3, can simultaneously sense each magnetized ring 120'. An advantage of magnetized rings is that the piston rod 12 can rotate without affecting the ability of the read sensors 21 to sense the linear position of the piston rod; that is, there is no dependence on precise alignment between the read sensors 21 and tracks of magnetized regions. In effect, this embodiment does not have tracks in the sense of FIG. 10A. In this embodiment, the redundant sets 23 of read sensors 21, not the magnetized regions 120' define distinct tracks.

FIG. 10C shows another embodiment in which certain types of magnetized regions 132 are interspersed with the magnetized regions 120. The special magnetized regions 132 can serve to identify a particular location on the piston rod (i.e., identify an absolute position) or to provide an event marker. In one embodiment, these special magnetic regions 132 have twice the axial length of the other magnetized regions 120 (i.e., comprised of two adjacent regions 120 magnetized with the same magnetic alignment). When the read sensors 21 detect these magnetic regions 132, the read-head electronics 22 determines that the piston rod has reached a particular position within the cylinder 2. For example, such magnetized regions 132 (i.e., double-length regions) can appear after every ten magnetized regions 120. The means for distinguishing special regions 132 from the other magnetized regions 120 may vary without departing from the principles of the invention (e.g., thrice the length of the magnetized regions 120, or twice the width of the magnetized region 120, or combinations of different length and widths).

FIG. 10D shows another embodiment in which the magnetized regions 120 are recorded in the magnetically hard layer 12 in a checkerboard pattern: each track 124 has an alternating pattern of positive and negative polarities and every other track 124 has the same alternating pattern. Accordingly, each magnetized region 120, other than those at the upper and lower edges of the pattern, is surrounded on four sides by a magnetized region 120 recorded with an opposite polarity. Thus, a read sensor 21 can sense a magnetic transition when the piston rod 120 moves linearly and rotationally.

As noted above, relative encoding schemes determine piston rod position by maintaining a count of sensed magnetized regions. The count needs to be remembered even after the machine is turned off. In some types of machinery, the piston rod 12 may drift after the machine is turned off (e.g., after the hydraulics bleed off). Accordingly, a battery continually energizes the read sensors 21 and read-head electronics 22 when power to the machine is off. By maintaining a supply of power, the read sensors 21 can detect any drifting movement of the piston rod and the read-head electronics 22 can compute and record the piston rod position although the machine is not operating. When the machinery is turned on again, the current position of the piston rod within the cylinder is known.

Maintenance

In one embodiment, a write head can be integrated with a read sensor, e.g., in the flux-sensing apparatus 20 of FIG. 1, to allow dynamic repair of damaged or erased magnetic bits. The write head can be axially aligned with and spatially separated by a known distance from the read sensor by, e.g., a multiple of the axial length of the magnetized region to be written. When the read sensor detects a damaged or erased magnetized region, the write head can be energized to restore the transition zone to a proper degree of magnetization. Use of an integrated write head enables magnetization of the piston rod during field service or maintenance of the machinery or equipment, without needing an additional calibration device. The position-sensing system can employ a write head for each track (i.e., corresponding to magnetized regions (FIG. 10A) or to sets 23 of read sensors (FIG. 3)).

Reliability

Various combinations of the above-described features operate to protect against accidental or intentional erasure of information recorded in the magnetically hard layer. One such feature is redundancy: read sensors situated about the circumference of the piston rod read redundant axial tracks of magnetized regions or rings that encircle the piston rod. Thus, the entire circumference would need to be disturbed to cause failure of the position-sensing system. Another feature is the selection of a high coercivity material, such as CoNiP, for the magnetically hard layer, which can make the recorded information more difficult to erase. Perpendicular magnetization of the magnetically hard layer can further increase the difficulty with which to demagnetize the magnetically hard layer. In addition, improved GMR read sensors can read low amounts of flux and may therefore still be able to read incompletely erased magnetic bits.

Although the invention has been shown and described with reference to specific preferred embodiments, it should be understood by those skilled in the art that various changes in form and detail may be made therein without departing from the spirit and scope of the invention as defined by the following claims. For example, although the embodiments described above relate primarily to sensing piston rod position for linear movement, the principles of the invention can be used to determine distance traveled, position, velocity, acceleration, and movement direction for sensing rotary motion of the piston rod with respect to the cylinder. In addition, other embodiments of the invention can implement the position-sensing system, including the magnetically hard layer and read sensors, on components that are actuated by the piston rod, instead of or in addition to being implemented on the piston rod itself.

What is claimed is:

1. A position-sensing system, comprising:
a cylinder;
a piston rod movably coupled to the cylinder for movement with respect thereto;
a magnetically hard layer formed on the piston rod to provide a recording medium, a plurality of regions of the magnetically hard layer being perpendicularly magnetized to provide an encoding scheme for determining a position of the piston rod relative to the cylinder; and
a plurality of magnetic-field sensors coupled to the cylinder in proximity of the magnetically hard layer to sense the perpendicularly magnetized regions while the piston rod is moving with respect to the cylinder, at least two of the magnetic-field sensors being axially positioned to sense the same set of magnetized regions in succession and to generate signals in response to the sensed magnetized regions that can be used to determine a position of the piston rod.

2. The position-sensing system of claim 1, wherein the piston rod is made of a ferromagnetic material and the magnetically hard layer is disposed adjacent to an outer surface of the ferromagnetic material without any intervening non-magnetic layer.

3. The position-sensing system of claim 1, further comprising a magnetically soft intermediate layer between the magnetically hard layer and the piston rod.

4. The position-sensing system of claim 3, wherein the piston rod is made of a ferromagnetic material.

5. The position-sensing system of claim 3, wherein the piston rod is made of a non-magnetic material.

6. The position-sensing system of claim 1, wherein at least one given magnetic field sensor is positioned at a greater distance from the magnetically hard layer than the magnetic field sensors positioned to sense the perpendicularly magnetized regions, the given magnetic field sensor sensing an ambient field used to perform common-mode rejection.

7. The position-sensing system of claim 1, further comprising a power source supplying electrical power to the plurality of magnetic field sensors and associated read-head electronics when equipment using the position-sensing system is off so that the magnetic field sensors can sense movement of the piston rod with respect to the cylinder while the equipment is off.

8. The position-sensing system of claim 1, wherein the plurality of perpendicularly magnetized regions are disposed in spatially separated tracks extending along in a direction of the motion of the piston rod, with at least two magnetic field sensors for each track of perpendicularly magnetized regions.

9. The position-sensing system of claim 1, wherein the piston rod is cylindrically shaped and the perpendicularly magnetized regions include rings around a circumference of the piston rod.

10. The position-sensing system of claim 1, further comprising a flux concentrator near each magnetic field sensor of the plurality of magnetic field sensors, to improve sensing of the perpendicularly magnetized regions.

11. The position-sensing system of claim 1, further comprising a second plurality of perpendicularly magnetized regions for providing an absolute measurement associated with movement of the piston rod.

12. The position-sensing system of claim 1, further comprising a write head, integrated with the plurality of magnetic field sensors, for repairing damaged or erased perpendicularly magnetized regions.

13. The position-sensing system of claim 1, further comprising means for computing and storing positional information based on output signals produced by the plurality of magnetic field sensors, wherein the positional information can be displayed or used to control movement or position of a machine or of a component thereof.

14. A method for sensing a position of a piston rod moving relative to a cylinder, the method comprising:
    forming a magnetically hard layer on the piston rod to provide a recording medium for storing information;
    perpendicularly magnetizing information at a plurality of regions of the magnetically hard layer;
    reading, by a plurality of magnetic field sensors, the same perpendicularly magnetized regions of the magnetically hard layer while the piston rod is moving relative to the cylinder; and
    generating output signals by the plurality of magnetic field sensors from which a position of the piston rod with respect to the cylinder can be determined.

15. The method of claim 14, wherein the piston rod is made of a ferromagnetic material and the magnetically hard layer is disposed adjacent to an outer surface of the ferromagnetic material without any intervening non-magnetic layer.

16. The method of claim 14, further comprising providing a magnetically soft intermediate layer between the magnetically hard layer and the piston rod.

17. The method of claim 16, wherein the piston rod is made of a ferromagnetic material.

18. The method of claim 16, wherein the piston rod is made of a non-magnetic material.

19. The method of claim 14, further comprising sensing an ambient field for use in performing common-mode rejection.

20. The method of claim 14, further comprising supplying electrical power to the plurality of magnetic field sensors and associated read-head electronics when a machine integrated with the cylinder and piston rod is off so that the magnetic field sensors can detect movement of the piston rod with respect to the cylinder while the machine is off.

21. The method of claim 14, wherein the perpendicularly magnetizing information at a plurality of regions of the magnetically hard layer includes perpendicularly magnetizing information in spatially separated tracks extending in a direction of the motion of the piston rod, and further comprising reading each track of perpendicularly magnetized information with at least two magnetic field sensors.

22. The method of claim 14, further comprising concentrating flux near each of the plurality of magnetic field sensors to improve the reading of the perpendicularly magnetized regions.

23. The method of claim 14, further comprising sensing a damaged or erased perpendicularly magnetized region and dynamically repairing this region.

24. The method of claim 14, further comprising computing and storing positional information based on output signals produced by the plurality of magnetic field sensors, wherein the positional information can be displayed or used to control movement or position of a machine or of a component thereof.

* * * * *